June 24, 1969　　　　E. J. HELLUND　　　　3,451,919
APPARATUS FOR SYNTHESIZING A HIGH ENERGY YIELDING SOLID MATERIAL
Filed Sept. 29, 1964　　　　　　　　　　　　Sheet _1_ of 2

EMIL J. HELLUND
　　INVENTOR.

BY White & Haefliger

June 24, 1969     E. J. HELLUND     3,451,919
APPARATUS FOR SYNTHESIZING A HIGH ENERGY YIELDING SOLID MATERIAL
Filed Sept. 29, 1964     Sheet 2 of 2

EMIL J. HELLUND
*INVENTOR.*

BY White & Haefliger

United States Patent Office 3,451,919
Patented June 24, 1969

3,451,919
APPARATUS FOR SYNTHESIZING A HIGH ENERGY YIELDING SOLID MATERIAL
Emil J. Hellund, South Laguna, Calif., assignor, by mesne assignments, to the United States of America as represented by the Secretary of the Air Force
Filed Sept. 29, 1964, Ser. No. 400,274
Int. Cl. B01k *1/00*
U.S. Cl. 204—312   9 Claims This invention relates generally to apparatus for stabilizing energetic molecular and atomic states, and more particularly concerns synthesis equipment for effecting stabilization of these high energy molecular states in solid matter (referred to as "hybrid state").

Generally speaking, the invention concerns creation of hybrid material wherein sufficient atoms are in a metastable state, characterized by greater than normal separation of charge conjugate (positive and negative) pairs, that the material as a whole will exhibit an energy yield significantly above that of the normal combustion energy yield of the material. In this regard, one may view such material as a hybrid containing matter in "ion-electron" complex or metastable state (characterized by a large separation of charge conjugate pairs), combined with matter in the "ground" state (character by a relatively much closer, or normal, association of charge conjugate pairs). The hybrid material might be otherwise characterized as a "plasmasol," denoting an "alloy" of a plasma in a solid matrix. Further, the electrical charge is not free to move through the matrix. Mobility of charge is associated with decay of the activated or metastable state. Practical handling of the hybrid material, prior to transformation of potential energy during ultimate usage, requires low decay rates.

Basically, the novel synthesis apparatus includes means containing a reaction zone for receiving an electrically insulating organic in vapor form and a gas capable of conversion to a plasma, electrical means for raising the energy of the gas in said zone to convert the gas to plasma state, and means for affecting condensation of the vapor and plasma in a solid combined form. More specifically, the electrical means includes high voltage electrode structure proximate the reaction zone. The condensation effecting means includes a condensate receiver and a heat sink for withdrawing heat from the receiver during the condensation operation. Regarding such heat withdrawal, whatever the structure of the solid hybrid material, it is capable of being destroyed by addition of energy to the various chemical bonds. If such energy is present in the reagent system during formation of the bonds, as during condensation of the reagents, it must be rapidly withdrawn. Accordingly, it will be seen that success in producing the resultant hybrid solid material involves a solution to the problem of maintaining sufficient energy input to create the excited states or high energy levels, yet removing sufficient energy to obviate destructive decay of the condensed hybrid. This problem is solved by rapidly withdrawing excess energy from the reagents as they condense and form bonds characteristic of the resultant new hybrid matter, excess energy withdrawal being accomplished by a rapid heat quenching action.

One class of gaseous systems found to be compatible with the above energy requirements consists of helium, as well as oxygen and nitrogen as the plasma convertible gas, together with vaporous organic material exhibiting high resistivity to electron movement and low mobility for the atomic constituents. Otherwise stated, the usable organics consist of those having very low electrical conductivity and also poor thermal conductivity, together with a high degree of cohesiveness in the hybrid state.

The synthesis equipment also typically includes means for maintaining vacuum conditions in the reaction zone during the condensation of hybrid, as well as means to supply the organic vapor and plasma convertible gas thereto; the electrode structure may include a grid to pass the organic vapor to the reaction zone; the condensate receiver has a surface presented toward but spaced from the grid to receive the condensate; and controllable (in the sense of heat input) vaporizer apparatus is typically provided in the reaction chamber for supplying organic vapor at controlled rates to pass through the grid and into the reaction zone. In addition means is typically provided to supply helium, oxygen and nitrogen gas to the reactor interior to maintain the pressure of such components herein within a predetermined critical range during the reaction interval. Further, means may be provided to effect initial application to the receiver surface of a spallative material to aid in removal of the deposited hybrid. Finally, novel double reactor apparatus is provided to double the rate of production of hybrid material within a single reaction chamber.

These and other objects and advantages of the invention will appear in greater detail in the following detailed description, and the drawings in which.

A discussion of molecular energy should precede a discussion of the synthesis method, product and apparatus. In general, there are two different approaches to storing energy in matter. One approach brings nuclear forces into consideration, whereas the other concerns electrical forces existing between electrons and protons residing in the various nuclei of the molecules. The present invention is concerned with the second or latter approach, and involves what may be termed a high energy state.

Figure 1:
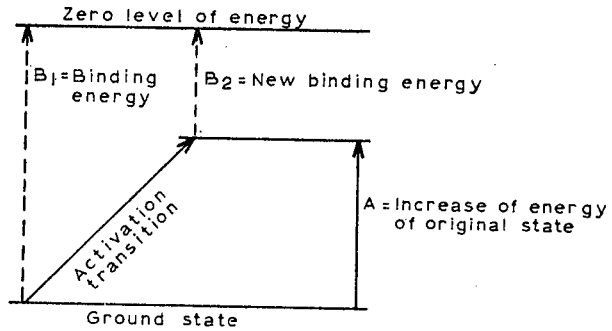
FIGURE 1 is an energy level diagram.

To understand what is meant in a structural sense by a high energy state in atomic and molecular systems, it should be recalled that the absolute value of the energy of a given state, all forces being electrostatic, is equal to the average value of the kinetic energy of the electrons, or, one-half the absolute value of the average potential energy of the electrons in the field of the positive charges residing in the nuclei of the atom. If the energy of a given state is increased, the result can be interpreted, according to FIGURE 1, as a decrease of binding energy, i.e. the energy binding the electrons to the protons. In FIGURE 1, the numeral $B_1$ denotes the energy necessary to dissociate the molecule, that is, to decrease the binding energy to zero. If energy A is added to the system, the molecule is depicted as reaching a level at which the remaining energy necessary for dissociation is $B_2$. The actual energies of the two states are, according to the zero energy level shown, equal to $-B_1$ and $-B_2$ respectively, with $B_2$ less than $B_1$.

In the activated state, therefore, the system will have an average kinetic energy equal to $B_2$ and a potential energy equal to $-2B_2$. Since the potential energy between the positive charge on the representative nucleus, Ze, and the negative charge on the electron, $-e$, is equal to the following expression:

$$Ze^2/r \quad (1)$$

where $r$ is the distance between the electron and the nucleus, it can be stated that:

$$\frac{r}{B_2} > \frac{r}{B_1} \quad (2)$$
(activated state) (ground state)

that is, an increase in charge separation must accompany an increase in energy of a given atomic or molecular system, neglecting the effect of repulsion between like charges.

An increase in charge separation will in general occur by expansion of the entire structure under consideration; however, a change of state of energy of a given solid need not imply a uniform expansion of all bonds, but can take place in such a way as to absorb energy in only a limited number of charge conjugate pairs. Such states can be viewed as containing activated material embedded in a lower energy matrix.

The picture of the activated state just presented serves to emphasize the rather special chemical and physical properties associated with it. One should consider the resultant material, owing to its changed bonding arrangement, as a new compound differing in an essential way from the ground state material. Viewed in terms of an increase of positive and negative charge separation, one can regard the high energy solid state as a hybrid of an "ion-electron" state combined with a "ground" state characterized by a much closer association of charge conjugate pairs. For this reason the state will frequently be referred to as a hybrid or a "plasmasol" to denote an "alloy" of a plasma in a solid matrix. As such, one should not allow this viewpoint to suggest that the charges are free to move through the matrix. Mobility is the vehicle by which the excited state decays, that is, a movement of charge is necessary for a transformation of potential energy and therefore of the total energy of the state. The charges must be restricted in movement by the existence of barriers, and if these are sufficiently high the decay rate of the state will be low enough to permit practical utilization of the material.

With this background one can proceed to a discussion of just how such a hybrid or plasmasol is to be synthesized. Whatever the structure of the hybrid compound, it is capable of being destroyed by adding energy to the various bonds. The mechanism of synthesis must therefore provide for rapid removal of such energy if present at formation of the bonds, or, must avoid the introduction of such energy during the synthesis. If large amounts of energy are available during compounding it is difficult to avoid destructive triggering of decay mechanisms (induced decay). Insufficient energy for the creation of the excited states (high energy levels) would preclude their formation as a violation of the law of conservation of energy. Accordingly, the reactive mechanism to be employed must supply the correct molecules with just the right amount of energy and provide also a fast quenching environment for removal of excess energy.

Figure 2:
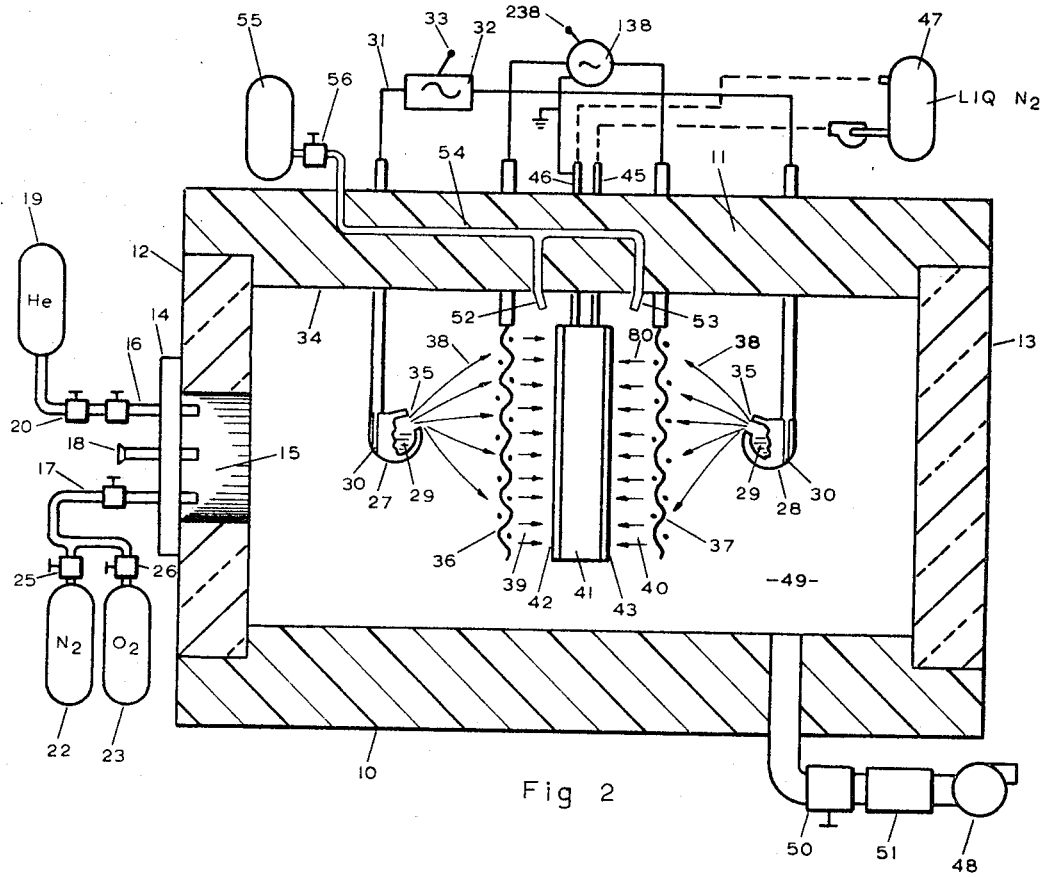
FIGURE 2 is a schematic vertical section taken through reactor apparatus usable in practicing the inventive process.

Referring now to the specific apparatus seen in FIGURE 2, a vacuum chamber 10 is provided with insulating walls which typically include 3 inch thick micarta panels 11 as well as 2 inch thick Plexiglas windows 12 and 13, suitable gaskets being used at the joints. An insulating plate 14 covers an opening 15 through window 12, and supports helium inlet duct 16, gas inlet duct 17, and a thermocouple probe 18 useful for sensing the chamber interior pressure. Helium source 19 is connected to duct 16 via appropriate valving 20, and nitrogen and oxygen sources 22 and 23 are connected to ducting 17 via valves 25 and 26. Chamber 10 is typically 600 millimeters long between the outer surfaces of windows 12 and 13.

Located within the chamber interior are two evaporators in the form of stainless steel receptacles 27 and 28 for holding the insulative organic material to be evaporated and shown at 29. The receptacles may be heated, as for example by heater elements 30 electrically connected at 31 to a current source 32 having a control 33 enabling manual control of heating and hence the rate of evaporation of the organic material 29 and the rate of deposition of the hybrid. The receptacles are spaced about 114 millimeters below the undersurface 34, and have vapor outlets 35 facing toward one another and toward grids 36 and 37, arrows 38 depicting the flow of vapor toward the latter.

Grids or electrodes 36 and 37 are spaced about 83 millimeters from the centers of receptacles 27 and 28, respectively, and consist of fine stainless steel wire in mesh form and having openings of at least ¼ inch by ¼ inch size. The spacing between the grids is about 4 inches. A source of high voltage for the grids is indicated at 138, and as controllable at 238 the applied AC-voltage being sufficient to provide an ionizing glow discharge within the reaction zones 39 and 40 to sustain the gaseous plasma therein. Central brass plate 41 acts as a grounded electrode for the glow discharge, the latter being shunted around the edges or peripheries of a pair of thin non-conductive plates 42 and 43 acting as receivers for the deposited material. Plates 42 and 43 are in direct contact with opposite faces of the brass plate 41.

Each of the glass plates 42 and 43, the grids 36 and 37 and the grounded brass plate 41 is about 178 millimeters square; the glass plates 42 and 43 being approximately 2 millimeters thick and carried by the grounded plate 41. The spacing between glass plates 42 and 43 and the respective electrodes 36 and 37 is 38 millimeters, and the thickness of grounded plate 41 is approximately 13 millimeters. With source 38 operating at 2,000 volts and 60 cycles per second, a current of 20 milliamperes is maintained in the reaction zones 39 and 40 when the pressure is reduced in the chamber as described below.

Figure 3:
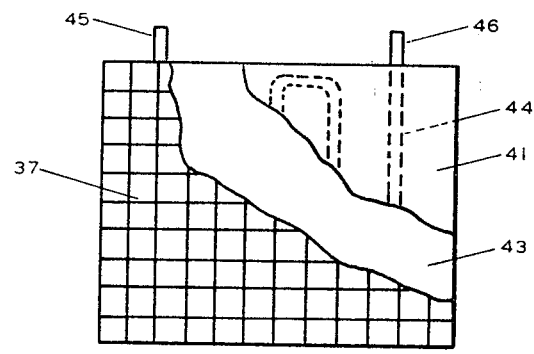
FIGURE 3 is a frontal view of a grid in FIGURE 2 and partly broken away to show plate structure behind the grid.

Central plate 41 contains a passage 44, better seen in FIGURE 3, through which liquid nitrogen is circulated at $-196°$ C., inlet and outlet ducts 45 and 46 communicating between the opposite ends of passage 44 and the liquid nitrogen source indicated at 47. A vacuum pump is shown at 48 as having its inlet in communication with the interior 49 of the chamber 10 via ducting 50 having a cold trap 51 in series therewith. The pump is typically capable of reducing the chamber interior pressure to 1 micron of mercury ($1\mu$ Hg).

The following example is typical of the processing: samples of ceresin (a mixture of long chain aliphatic hydrocarbons with carbon numbers between 20 and 35. The average carbon number is approximately 28) are placed in the evaporator and the chamber 10 is closed. Oxygen and nitrogen gas are admitted to the chamber in the proportion 1 mole of $O_2$ to 4 moles of $N_2$, as exists in air. The chamber is then pumped down to a partial pressure of oxygen and nitrogen of about 40 microns of mercury. Liquid nitrogen (at $-196°$ C.) is then circulated through plate 41, and the oxygen and nitrogen pressure in chamber 10 drops to between 28 and 32 (optimum is 30) microns of mercury. Glass plates 42 and 43 are, accordingly, kept cooled to near $-196°$ C. The vaporizers are then started to vaporize ceresin, and helium is admitted to the chamber, so that the helium and ceresin vapor make up between 17 and 23 microns of mercury (optimum is $20\mu$ Hg), and so that the total pressure in the chamber is raised to between 45–55 microns of mercury, and preferably near 50 microns of mercury. A glow discharge is then produced in the reaction zones 39 and 40 by connecting 60 cycle 2,000 volt source 38 thereto, producing a current of about 20 milliamps through the plasma in those zones. The evaporation of ceresin is then controlled to deposit between 20 and 90 milligrams per hour on the non-conducting plates. During such deposition, oxygen and nitrogen are maintained in the chamber in the correct proportions and the vacuum pump operated to maintain the pressure within the range 45–55 microns of mercury. Arrows 80 indicate the molecular condensation current path in the reaction zones. After 4½ hours the equipment is shut down and the sample deposits are recovered in the form of thin, very hard films having cellophane-like appearance and being light brown in color. In this way about 288 milligrams of sample hybrid material in polymerized form may be produced over a 4½ hour run, the material typically yielding between 17,000 and 45,000 calories per gram upon combustion. The same weight of normal ceresin will typically yield only about 10,000 calories per gram upon combustion. Some improvements in yield can be realized by operating the reactor so as to verify, i.e. increase and decrease the rate of deposition of the hybrid during a run. This can be effected through control of ceresin vaporization. It is also contemplated that the raw material need not be in solid state, initially, so that vapor or gaseous state organic materials of insulative quality may be directly introduced into the reactor chamber.

Removal of the films from the cold surfaces of the non-conducting plates may be accomplished by scraping or by utilization of an undercoat of inert material which will spall off the cold plate upon an increase in temperature thereof. The spallative coat must be free of breakdown in an electrical discharge environment, should be non-reactive and should have a low vapor pressure to prevent interference with the collision dynamics in the glow discharge. Xenon and radon satisfy these requirements and may be sprayed on the exposed surfaces of the non-conducting plates 42 and 43 prior to process coating by the hybrid material. For this purpose, brass jets 52 and 53 are provided as shown in FIGURE 2 to have outlets in chamber interior 49 and directed toward the cold plates, the jets communicating via line 54 with source 55 via valving 56. Some improvement in uniformity of xenon coating of plates 42 and 43 may be realized by preliminary introduction of a gaseous fluoride such as tetrafluoromethane into the chamber 49 at a pressure of about 150 microns of mercury, and running the glow discharge in reaction zones 39 and 40 for about 10 minutes.

The presence in the reaction zones of oxygen and nitrogen is necessary to the creation of the high energy state in the hybrid material. The precise nature of the function of these components is not yet known and must await more elaborate study, since a host of compounds and radicals can be created involving $O_2$ and $N_2$. This follows from the occurrence of fragmentation or cracking of the organic material such as ceresin in the reaction zones. Among those believed to be present in the reaction zones are $H_2O$, $NH_3$, $NO$, $NO_2$, $CO$, $CO_2$ $CN$, and $HCN$.

The following additional examples further illustrate the operation of the equipment of FIGURE 2 to produce the high yield product:

ADDITIONAL EXAMPLE 1

| Time | Operation |
|------|-----------|
| 0830 | The chamber interior pressure was pumped down to 45 microns of mercury. |
| 0845 | Liquid nitrogen was circulated through center electrode plate 41 to cool it to operating temperature. |
| 0900 | The substrate plates 42 and 43 were cold; vaporizers 27 and 28 were electrically heated by current of 43 amperes and 0.52 volt, or 22.3 watts each. A magenta colored glow discharge in zones 39 and 40 was produced by energizing grids 36 and 37 at 2000 volts and at 23 milliamperes current, or 40 watts. |
| 0900 to 1130 | Pressure in chamber interior 49 was kept close to 50 microns of mercury, and gases included oxygen and nitrogen in proportion 1 mole of oxygen to 4 moles of nitrogen, as well as helium. The sample slowly deposited on the plates. |
| 1330 | The run was ended after 4½ hours, and the equipment was shut down to allow the cold plates and deposited sample to warm up. |
| 1410 | The sample was recovered by placement of the substrate plates in a nitrogen gas atmosphere in a dry box, following which the deposits were scraped off the plates and recovered as three samples. Burning of the samples in a bomb calorimeter indicated the following yields: |

| Sample No. | Weight (mg.) | Yield (cal./gram) |
|---|---|---|
| 1 | 103.05 | 16,900 |
| 2 | 30.35 | 45,000 |
| 3 | 15.12 | 13,300 |

ADDITIONAL EXAMPLE 2

| Time | Operation |
|------|-----------|
| 0830 | Pumped down chamber interior and at 0840 commenced cooling down the plate 41 by liquid nitrogen circulation, until air pressure in chamber reduced to 30 microns of mercury. |
| 0910 | The substrates were now cold and pressure in the chamber was at 20 microns of mercury. Helium was admitted to the chamber interior until pressure rose to 50 microns of mercury. The run was started with the vaporizers operated at 43 amperes and 0.52 volt (22.3 watts) and the glow discharge at 2800 volts and 14.3 milliamperes (40 watts). The glow discharge was magenta in color, excepting that proximate the substrate surfaces the discharge was slightly greenish. |
| 1000 | Discharge voltage supplied to electrodes 36 and 37 was increased to 2800 volts at 20 milliamperes (56 watts). |
| 1100 | Discharge voltage dropped to 2100 volts at 20 milliamperes (42 watts), and color of discharge was observed to be bluish. |
| 1340 | Ended run after 4½ hours, and began warm-up with helium being admitted to bring cell interior to 25 mm. pressure during the warm-up. Sample observed to have same appearance as in Additional Example 1 above. |
| 1420 | Recovered sample using same procedure as in Example 1 above; sample was divided into 4 parts and these had the following yields upon testing in a combustion calorimeter: |

| Sample No. | Weight (mg.) | Yield (cal./gram) |
|---|---|---|
| 1 | 131.27 | 22,000 |
| 2 | 91.32 | 17,500 |
| 3 | 67.76 | 30,700 |

With samples that reacted explosively upon combustion in a bomb calorimeter, it was found that the initial pressure rise occurred very rapidly and over a period less than 100 microseconds. A sample of hybrid material produced by the process described in the initial example above was exploded to produce such a pressure rise.

ANALYSIS OF THE HYBRID

While it is extremely difficult to determine what complex phenomena occur in the plasma during reaction in zones 39 and 40, it is possible to reach valuable conclusions by studying the effect of the presence of water or moisture in chamber interior 49 upon the combustion energy of the hybrid product. In this regard, water vapor was leaked into the system as a constituent of air, and by measuring the absolute humidity and the pressure of air maintained inside the reactor chamber under set vacuum pumping conditions, and by recording the combustion energy of the hybrid it has been possible to determine the relationship between the two.

An experimentally derived expression for the yield in kilocalories per gram of hybrid material obtained through operation of the FIGURE 2 apparatus is as follows:

$$Y_{kcal/gram} = -55 + 372 \left\{ \left[1 + \frac{p_s H}{80}\right] \left[1 + \frac{(p_{O_2}-9)^2}{192}\right] \right.$$
$$\left. \left[1 + \frac{(p_{N_2}-36)^2}{3100}\right] \left[1 + \frac{(p_s-45)^2}{770}\right] \left[1 + \frac{(P-50)^2}{576}\right] \right\}^{-1}$$
(3)

where $p_{O_2}$ = starting oxygen pressure in $\mu$ Hg,
$p_{N_2}$ = starting nitrogen pressure in $\mu$ Hg,
$p_s$ = starting air pressure in $\mu$ Hg equals $p_{O_2} + p_{N_2}$,
P = running pressure in $\mu$ Hg,
H = mm. Hg of $H_2O$ in air mixture leaked into reactor.

Equation 3 is valid only for a 2000 volt 20 milliamperes glow discharge in the reaction zones 39 and 40.

Figure 4:
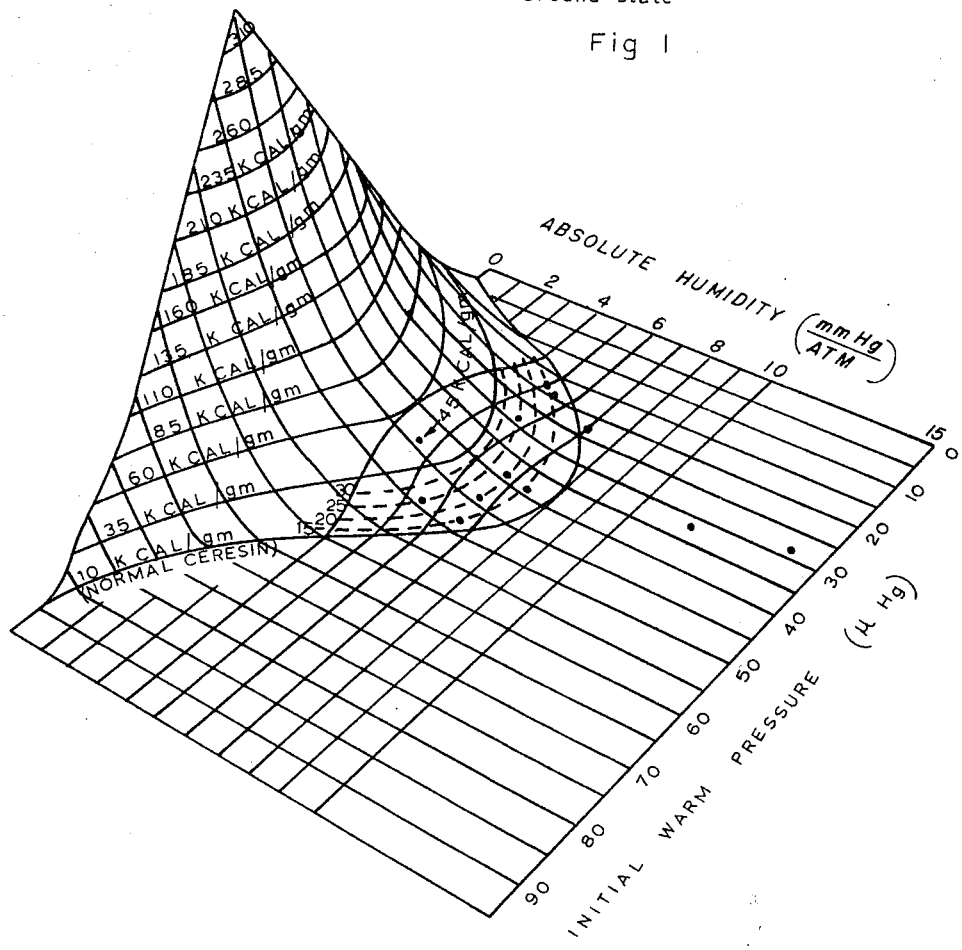
FIGURE 4 is a perspective showing, in relief, of a typical yield function.

FIGURE 4 is a relief map of the yield function Y showing its critical dependence on absolute humidity H and initial warm pressure $p$, the height of the hump at different points indicating yield values. This particular relief map is indicative of a class of such maps, the particular values on the map shown being valid only for the system of gases described in the detailed examples above, and for a running pressure in the reactor of 50$\mu$ Hg, total. It is clear from this relief map that moisture should be excluded from the reaction zones in the reactor in order to reach maximum energy yields in the hybrid material and to avoid chemisorption. It is also clear from this relief map that the initial warm pressure in the reaction zones must be kept within a critical range to realize the high energy yields. Points on the map show actual energy yield values for hybrid materials produced by the process described herein.

Referring again to the plasmasol synthesis process, the resultant sample material in film form is found to consist of a dielectric exhibiting high resistivity. Also, while the frequency of the glow discharge voltage does not presently appear critical, the voltage itself should be maintained in the neighborhood of 2,000 volts and within the range 1,500 to 3,000 volts, and it is believed that the discharge current should be between 15–30 milliamperes, these values being for the particular size apparatus described above. As to the usable organic source materials, it is presently believed that these include the heavier (20–35 carbon atoms) organics, as for example branched or straight chain paraffin, having oxidizing elements or groups hooked onto the carbon atoms.

I claim:

1. Apparatus for synthesizing a high energy yielding solid material, comprising chamber means containing a reaction zone for receiving an electrically insulating material in vapor form and a gas capable of conversion to a plasma, electrical means for raising the energy of the gas in said zone to convert the gas to plasma state, said electrical means including high voltage electrode structure proximate said zone, means for effecting condensation of the vapor and plasma in solid combined form, said last named means including a condensate receiver and a heat sink for withdrawing heat from said receiver during said condensation, said electrode structure including a grid electrode to pass said vapor, another electrode spaced from said grid electrode, said condensate receiver including a cooled electrically insulative portion interposed between said other electrode and said grid electrode and having a surface presented toward but spaced from the grid to receive said condensate, means for supplying said vapor to pass through said grid and into said zone and for supplying said gas, and means for maintaining vacuum conditions in said reaction zone during said condensation.

2. Apparatus as defied in claim 1 in which said vaporizer apparatus is contained within said chamber means.

3. Apparatus as defined in claim 2 including means for supplying oxygen and nitrogen to said chamber means for conversion to plasma.

4. Apparatus as defined in claim 3 including means for supplying helium to said chamber means.

5. Apparatus as defined in claim 3 including a supply of electrically insulating hydrocarbon at said vaporizer apparatus for conversion to vapor.

6. Apparatus as defined in claim 5 including means to control the rate of hydrocarbon vaporization in order to control the rate of solid material condensation at said receiver.

7. Apparatus as defined in claim 1 including means to effect initial application to said surface of a coating capable of spalling off said surface upon temperature increase thereof.

8. Apparatus for synthesizing a high energy yielding solid material, comprising chamber structure containing a pair of reaction zones for receiving electrically insulating material in vapor form and a gas capable of conversion to a plasma, electrical means for raising the energy of the gas in said zones to convert the gas to plasma state, said electrical means including spaced high voltage electrodes, said zones being in the spaces between said electrodes, means for effecting condensation of the vapor and plasma in solid combined form, said last named means including a condensate receiver and a heat sink for withdrawing heat from said receiver during said condensation, said receiver and heat sink projecting between said zones, said electrodes including grids to pass said vapor, another electrode spaced from said grids, said condensate receiver including cooled electrically insulative portions interposed between said other electrode and said grids and having surfaces presented toward but space from the grids to receive said conensate, means for supplying said vapor to pass through said grids and into said zones and for supplying said gas, and means for maintaining vacuum conditions in said reaction zones during said condensation.

9. Apparatus as defined in claim 7 including means to supply oxygen, nitrogen and helium thereto.

References Cited

UNITED STATES PATENTS 2,583,898  1/1952  Smith _____ 209—312
2,888,366  5/1959  Barsky et al. _____ 117—93.1

FOREIGN PATENTS 504,048  4/1939  Great Britain.

REUBEN EPSTEIN, *Primary Examiner.*

U.S. Cl. X.R.

204—322